United States Patent
Wu et al.

(10) Patent No.: US 10,077,637 B2
(45) Date of Patent: Sep. 18, 2018

(54) DEEP FORMATION EVALUATION SYSTEMS AND METHODS

(71) Applicant: HALLIBURTON ENERGY SERVICES, INC., Houston, TX (US)

(72) Inventors: Hsu-Hsiang Wu, Sugarland, TX (US); Burkay Donderici, Houston, TX (US); Robert Wayne Pennison, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 386 days.

(21) Appl. No.: 14/654,826

(22) PCT Filed: Dec. 23, 2012

(86) PCT No.: PCT/US2012/071550
§ 371 (c)(1),
(2) Date: Jun. 22, 2015

(87) PCT Pub. No.: WO2014/098919
PCT Pub. Date: Jun. 26, 2014

(65) Prior Publication Data
US 2015/0330190 A1   Nov. 19, 2015

(51) Int. Cl.
*G01V 3/00*   (2006.01)
*E21B 41/00*   (2006.01)
(Continued)

(52) U.S. Cl.
CPC .... *E21B 41/0092* (2013.01); *E21B 47/02216* (2013.01); *E21B 47/12* (2013.01); *G01V 3/26* (2013.01)

(58) Field of Classification Search
CPC ............... E21B 41/0092; E21B 47/12; E21B 47/02216; G01V 3/26
(Continued)

(56) References Cited

U.S. PATENT DOCUMENTS 3,406,766 A   10/1968 Henderson
4,072,200 A   2/1978 Morris
(Continued)

FOREIGN PATENT DOCUMENTS

WO   2008/076130   6/2008
WO   2010/005902   1/2010
(Continued)

OTHER PUBLICATIONS

RU Office Action, dated May 25, 2016, Appl No. 2015121653, "Deep Formation Evaluation Systems and Methods," Filed Dec. 23, 2012, 14 pgs.
(Continued)

*Primary Examiner* — Giovanni Astacio-Oquendo
(74) *Attorney, Agent, or Firm* — Benjamin Fite; Tumey L.L.P.

(57) ABSTRACT

Apparatuses, systems and methods for deep formation evaluations, at least some of which include LWD tool modules positioned along a drillstring with a first LWD tool module that includes a transmit antenna, a second LWD tool module that includes a receive antenna and at least one position measurement device that at least partially determines spatial locations of the transmit and receive antennas relative to each other. A formation model is then matched to a surrounding formation based at least in part on said relative spatial locations.

19 Claims, 4 Drawing Sheets

(51) Int. Cl.
*E21B 47/022* (2012.01)
*E21B 47/12* (2012.01)
*G01V 3/26* (2006.01)

(58) Field of Classification Search
USPC .............................. 324/338, 334, 332, 323
See application file for complete search history.

(56) References Cited

U.S. PATENT DOCUMENTS

| | | | |
|---|---|---|---|
| 4,224,989 A | 9/1980 | Blount | |
| 4,293,933 A * | 10/1981 | Park | G01V 1/48 367/25 |
| 4,443,762 A | 4/1984 | Kuckes | |
| 4,458,767 A | 7/1984 | Hoehn, Jr. | |
| 4,468,623 A * | 8/1984 | Gianzero | G01V 3/20 324/355 |
| 4,593,770 A | 6/1986 | Hoehn, Jr. | |
| 4,791,373 A | 12/1988 | Kuckes | |
| 4,875,014 A | 10/1989 | Roberts et al. | |
| 5,343,152 A | 8/1994 | Kuckes | |
| 5,358,050 A | 10/1994 | Schmidt | |
| 5,585,790 A | 12/1996 | Luling | |
| 5,676,212 A | 10/1997 | Kuckes | |
| 6,435,286 B1 | 8/2002 | Stump et al. | |
| 6,985,814 B2 | 1/2006 | McElhinney | |
| 7,554,327 B2 * | 6/2009 | Dewdney | G01R 33/3875 324/319 |
| 7,570,141 B2 * | 8/2009 | Hollis | G01R 33/3875 335/216 |
| 7,686,099 B2 | 3/2010 | Rodney et al. | |
| 7,982,464 B2 | 7/2011 | Bittar et al. | |
| 8,016,053 B2 | 9/2011 | Menezes et al. | |
| 8,030,937 B2 | 10/2011 | Hu et al. | |
| 8,085,049 B2 | 12/2011 | Bittar et al. | |
| 8,222,902 B2 | 7/2012 | Bittar et al. | |
| 8,347,985 B2 | 1/2013 | Bittar et al. | |
| 8,499,830 B2 | 8/2013 | Alberty | |
| 8,604,795 B2 * | 12/2013 | Overweg | A61B 5/055 324/322 |
| 8,612,155 B2 * | 12/2013 | Khadhraoui | G01V 1/40 702/16 |
| 8,917,094 B2 | 12/2014 | Bittar et al. | |
| 2004/0019427 A1 | 1/2004 | San Martin et al. | |
| 2005/0024060 A1 | 2/2005 | Bittar | |
| 2005/0183887 A1 | 8/2005 | Rodney | |
| 2009/0229826 A1 | 9/2009 | East, Jr. et al. | |
| 2011/0051552 A1 | 3/2011 | Piestre et al. | |
| 2011/0175899 A1 | 7/2011 | Bittar et al. | |
| 2011/0186290 A1 | 8/2011 | Roddy et al. | |
| 2011/0187566 A1 | 8/2011 | Soenen et al. | |
| 2011/0192592 A1 | 8/2011 | Roddy et al. | |
| 2011/0199228 A1 | 8/2011 | Roddy et al. | |
| 2011/0221443 A1 | 9/2011 | Bittar et al. | |
| 2011/0234230 A1 | 9/2011 | Bittar et al. | |
| 2011/0251794 A1 | 10/2011 | Bittar et al. | |
| 2011/0298461 A1 | 12/2011 | Bittar et al. | |
| 2011/0308859 A1 | 12/2011 | Bittar et al. | |
| 2012/0024600 A1 | 2/2012 | Bittar et al. | |
| 2012/0068712 A1 * | 3/2012 | Taherian | G01V 1/282 324/338 |
| 2012/0133367 A1 | 5/2012 | Bittar et al. | |
| 2013/0105224 A1 | 5/2013 | Donderici et al. | |

FOREIGN PATENT DOCUMENTS

| | | |
|---|---|---|
| WO | 2010/005907 | 1/2010 |
| WO | 2012/064342 | 11/2010 |
| WO | 2012/121697 | 3/2011 |
| WO | 2011/129828 | 10/2011 |
| WO | 2012/005737 | 1/2012 |
| WO | 2014/098919 | 6/2014 |

OTHER PUBLICATIONS

EP Extended Search Report, dated Sep. 7, 2016, Appl No. 12890306.9, "Deep Formation Evaluation Systems and Methods," Filed Dec. 23, 2012, 8 pgs.
AU Examination Report, dated Dec. 21, 2015, Appl No. 2012397192, "Deep Formation Evaluation Systems and Methods," Filed Dec. 23, 2012, 3 pgs.
PCT International Search Report and Written Opinion, dated Aug. 27, 2010, Appl No. PCT/US2010/040447, "Method and Apparatus for Sensing Elongated Subterranean Anomalies", filed Jun. 29, 2010, 9 pgs.
PCT International Preliminary Report on Patentability, dated Jan. 17, 2013, Appl No. PCT/US2010/040447, "Method and Apparatus for Sensing Elongated Subterranean Anomalies", filed Jun. 29, 2010, 7 pgs.
Canadian Examiner's Letter, dated Jan. 16, 2014, Appl No. 2,800,148, "Method and Apparatus for Sensing Elongated Subterranean Anomalies", filed Jun. 29, 2010, 3 pgs.
PCT International Search Report and Written Opinion, dated Mar. 8, 2013, Appl No. PCT/US2012/071550, Deep Formation Evaluation Systems and Methods, filed Dec. 23, 2012, 12 pgs.
PCT Written Opinion of the International Preliminary Examining Authority, dated Nov. 28, 2014, Appl No. PCT/US2012/071550, "Deep Formation Evaluation Systems and Methods," Filed Dec. 23, 2012, 6 pgs.
PCT International Preliminary Report on Patentability, dated Nov. 28, 2014, Appl No. PCT/US2012/071550, "Deep Formation Evaluation Systems and Methods," Filed Dec. 23, 2012, 8 pgs.
Canadian Search Report for Application No. 2,894,203 dated Jun. 13, 2018.

* cited by examiner

DEEP FORMATION EVALUATION SYSTEMS AND METHODS

BACKGROUND

Modern petroleum drilling and production operations demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools exist for use in LWD. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of multiple receive signals are compared to each other to measure the formation resistivity.

When plotted as a function of depth or tool position in the borehole, the logging tool measurements are termed "logs." Such logs may provide indications of hydrocarbon concentrations and other information useful to drillers and completion engineers. In particular, azimuthally-sensitive logs may provide information useful for steering the drilling assembly because they can inform the driller when a target formation bed has been entered or exited, thereby enabling modifications to the drilling program that will provide much more value and higher success than would be the case using only seismic data. However, the utility of such logs is often impaired by the latency between a drill-bit's penetration of a bed boundary and the collection of log information sufficient to alert the driller to that event.

BRIEF DESCRIPTION OF THE DRAWINGS

A better understanding of the various disclosed embodiments can be obtained when the following detailed description is considered in conjunction with the attached drawings, in which.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative apparatuses, systems and methods for producing deep formation evaluations using logging while drilling ("LWD") tools with multiple modules that may have different orientations relative to each other. An illustrative drilling environment suitable for using such apparatuses, systems and methods is first described, followed by a description of an illustrative drillstring with two LWD tool modules. The positional relationships between antennas housed within the LWD tool modules are also described and expressed mathematically, as are the effects of these relationships on received signals propagated through the surrounding formation. An illustrative system and a software-based method implemented by the system are described that perform deep formation evaluation of the surrounding formation based upon the antenna positions (i.e., location and orientation) and received signals. Finally, examples of embodiments that use more than two LWD tool modules are described.

Figure 1:
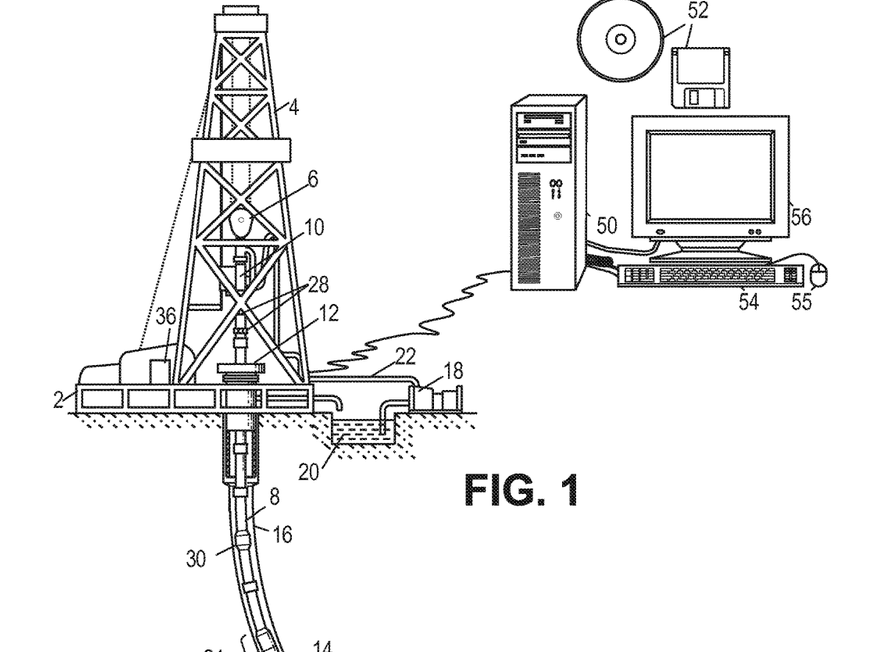
FIG. 1 shows an illustrative logging while drilling (LWD) environment.

The disclosed apparatuses, systems and methods are best understood in the context of the larger systems in which they operate. Accordingly, FIG. 1 shows an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formations. A pump 18 circulates drilling fluid 20 through a feed pipe 22, through the interior of the drill string 8 to drill bit 14. The fluid exits through orifices in the drill hit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as location, orientation, weight-on-bit, borehole diameter, etc. The tool orientation may be specified in terms of a tool face angle (rotational orientation), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Also included in bottom-hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub. A data processing system 50 receives a digital telemetry signal, demodulates the signal, and displays the tool data or well logs to a user. Software (represented in FIG. 1 as non-transitory information storage media 52) governs the operation of system 50. A user interacts with system 50 and its software 52 via one or more input devices 54 and 55 and one or more output devices 56. In some system embodiments, a driller employs the system to make geosteering decisions and communicate appropriate commands to the bottom-hole assembly 24.

The drillstring shown in FIG. 1 illustrates a directional drilling operation, wherein drilling is performed along a path other than a straight vertical path downward. In at least some illustrative embodiments, the change in direction is achieved using a "bent sub," which is a tubular section along the drillstring near the drill bit that is bent or curved. The bend or curve may be fixed or variable, with the direction of the drilling being determined either by the bend alone, or by a combination of the bend and the rotation of the drillstring. For example, if a downhole motor is used to drive the drill bit and a drillstring with a fixed bent sub is maintained at a fixed azimuthal orientation, the drill string will gradually change direction towards the direction of the bend. If instead such a drillstring is rotated, drilling will progress along a line parallel to the drillstring section above the bend and about which the drill bit processes.

For drillstrings capable of varying the angle of the bent sub, the sub is set to a desired angle and direction while the drillstring is maintained at a desired fixed azimuthal orientation, with the drill bit being driven by the downhole motor. This is sometimes referred to as "slide drilling," as the drillstring slides through the borehole without rotating. In other drillstring embodiments, the drillstring continues to be rotated and the angle of the bent sub is maintained by applying a force on the drillstring in a specific direction. This causes the sub to be pushed into the borehole wall opposite the desired drilling direction to create an angle between the drillstring pipes and/or bottom-hole assembly units to either side of the sub. Such systems are sometimes referred to as rotary steerable systems.

Because of the angle change introduced by the above-described subs and systems used in directional drilling, and because of the bends produced in the drillstring by the resulting borehole, logging tool modules located along the length of the drillstring may be oriented in different directions. This is particularly true for logging tools utilized in deep formation evaluation (i.e., tools wherein a transmitter antenna is separated from a receive antenna by at least 20 feet), as the transmit and receive antennas used in such tools may be housed in logging tool modules that are separated by larger distances (compared to other logging tools) in order to achieve the desired formation penetration of the transmitted signals. The greater the distance between the logging tool modules, the greater the inclination and strike angle differences may be between drillstring sections traversing a borehole path that is curved or otherwise not a straight line. As used herein, the inclination angle of an LWD tool module that houses an antenna is defined as the angle between a vertical z axis and the drillstring's z axis local to said antenna. The strike angle is defined as the angle between a reference vector normal to a vertical z axis and a projection onto a horizontal x-y plane of the drillstring's z axis local to the antenna.

Figure 2A:
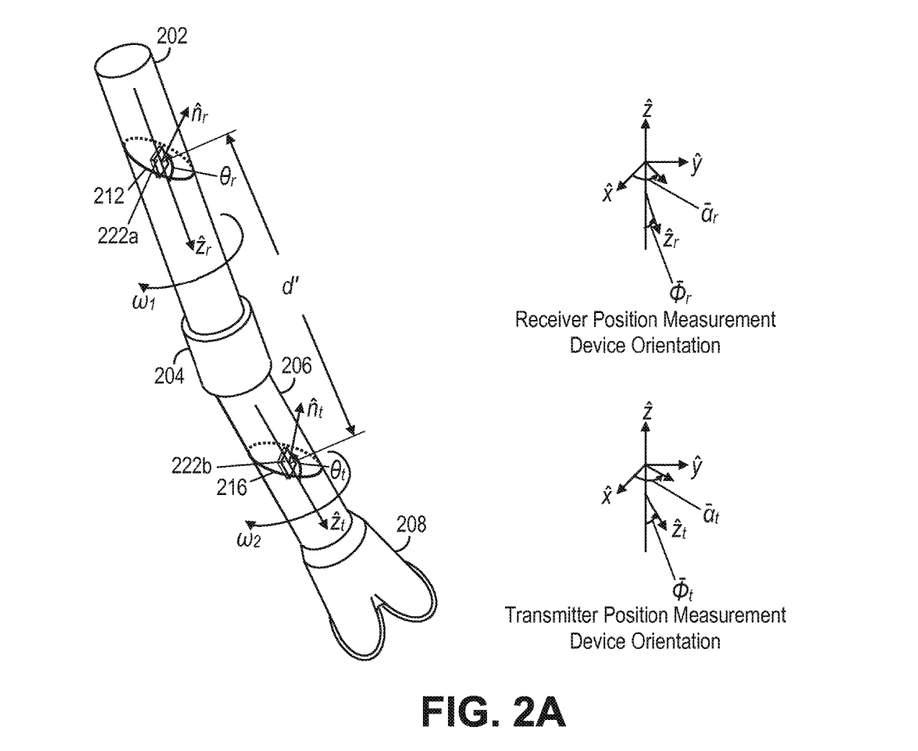
FIG. 2A shows an illustrative drillstring with two logging tool modules.

FIG. 2A shows an illustrative embodiment of a deep formation evaluation logging tool that includes two LWD tool modules 202 and 206 at different locations and orientations along a drillstring. In the embodiment shown, a resistivity logging tool receive antenna 212 and a corresponding receive antenna position measurement device 222a are housed within LWD tool module 202, while a resistivity logging tool transmit antenna 216 and a corresponding transmit antenna position measurement device 222b (components of an "at bit" instrument) are housed within LWD tool module 206. The position measurement devices locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool module's inclination angle ($\phi_r$ and $\phi_t$) and the distance d' between the antennas. Various methods may be used to locate the antenna positions (e.g., relative to a reference position on the surface), several of which are described in more detail below. It should be noted that although the bent sub angles are typically less than five degrees, the figures show much more pronounced angles to better illustrate the effect of the angles on the relative spatial locations of the antennas, described in more detail below.

The above-described antenna and LWD tool module orientations may be used to calibrate tool responses prior to performing an inversion process to model the surrounding formation. Such calibration is performed in order to be able to compare the modeled and measure results, as the modeled results assume known and fixed orientations and spatial locations of the resistivity logging tool transmit and receive antennas relative to each other, but the measured results may originate from antennas with any of a number of different relative orientations and spatial locations other than those presumed in the model. Measured and modeled results may be in the form of complex voltages, complex currents, resistivity values derived from measured/modeled voltages and/or currents, and/or ratios of voltages, currents and/or resistivities, just to name a few examples. Part of this calibration can be performed mathematically as one or more matrix rotations, while another part may be performed as a derivation of the relative spatial locations of and/or distance between antennas based on the antennas' locations and orientations. The resulting calibrated response is provided to the inversion, which uses these inputs to model the formation.

Equation (1), expressed more simply in equation (2), illustrates the rotation portion of the calibration process, taking into account each of the above-described angles;

$$V_R^T(t_0) = \begin{bmatrix} \sin(\theta_t + \phi_t(t_0))\cos\alpha_t(t_0) \\ \sin(\theta_t + \phi_t(t_0))\sin\alpha_t(t_0) \\ \cos(\theta_t + \phi_t(t_0)) \end{bmatrix}^T \begin{bmatrix} V_x^x(t_0) & V_y^x(t_0) & V_z^x(t_0) \\ V_x^y(t_0) & V_y^y(t_0) & V_z^y(t_0) \\ V_x^z(t_0) & V_y^z(t_0) & V_z^z(t_0) \end{bmatrix} \quad (1)$$

$$\begin{bmatrix} \sin(\theta_r + \phi_r(t_0))\cos\alpha_r(t_0) \\ \sin(\theta_r + \phi_r(t_0))\sin\alpha_r(t_0) \\ \cos(\theta_r + \phi_r(t_0)) \end{bmatrix}$$

$$V_R^T(t_0) = T_{vector}^T(t_0) \cdot V_{matrix}(t_0) \cdot R_{vector}(t_0) \quad (2)$$

where $T_{vector}^T(t_0)$ (shown in transposed form for convenience) is given by the transmit antenna's known tilt angle $\theta_t$, and by the inclination angle $\phi_t$ and azimuthal angle $\alpha_t$ as determined by the transmit antenna's position measurement device at time $t_0$; $R_{vector}(t_0)$ is given by the receive antenna's known tilt angle $\theta_r$, and by the inclination angle $\phi_r$ and azimuthal angle $\alpha_r$ as determined by the receive antenna's position measurement device at time $t_0$; and $V_{matrix}(t_0)$ is a 3×3 voltage matrix consisting of nine components $V_j^i$. Each component represents a theoretical voltage a receive antenna with a j axis orientation (x, y or z) in response to a signal from a transmit antenna with an i axis orientation (also x, y or z) for a given formation model, operating frequency and spacing d'.

Figure 2B:
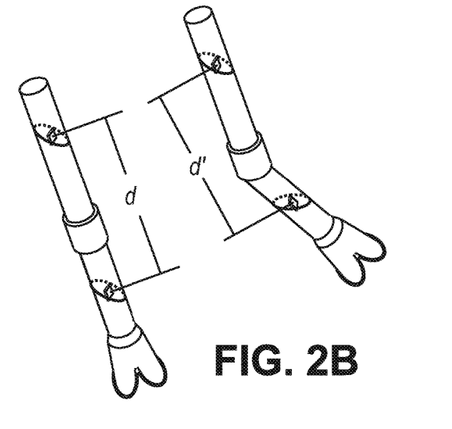
FIG. 2B shows an illustrative drillstring in both straight and bent configurations.

Another part of the calibration may involve determining the distance between the transmit antenna and the receive antenna. The distance between transmit and receive antennas changes when two or more LWD tool modules are positioned such that they no longer share a common z axis. For example, in FIG. 2A both LWD tool modules 202 and 206 are inclined such that each z axis ($z_r$ and $z_t$) is inclined at a different inclination angle $\phi$ ($\phi_r$ and $\phi_t$) relative to a vertical reference z axis. The inclination angle change reduces the original distance between the receive and transmit antennas 212 and 216 from original distance d when the drillstring was straight (bent sub 204 set to 0 degrees) to distance d'. This reduction is illustrated in FIG. 2B, which shows the drillstring of FIG. 2A in both straight and bent configurations, though the reduction can also be the results of flexing of the drillstring over long distances through curved and/or irregular boreholes. The distance reduction can be significant for high-resolution logging tools, where the difference between d and d' may be comparable in magnitude to the resolution of the logging tool. For example, for a look-ahead tool the distance between transmit and receive antennas can be as great as 100 feet, which for borehole paths with significant bends and/or irregularities can produce, in at least some instances, a difference between the original and calibrated distance of more than 10 feet.

A number of different known techniques may be used to determine a calibrated distance d'. For example, given a known original distance d between the two LWD tool modules of FIG. 2A when they are straight and aligned, d' can be determined by adjusting the original distance d using the equation, $$d' = d \cdot \cos(\phi_t - \phi_r) \quad (3)$$

Other, more complex configurations may require different trigonometric and/or geometric calculations, and may be based upon absolute rather than relative positions. For example, three-dimensional coordinates may describe the locations of a transmit and a receive antennas relative to a reference point on the surface, with differences in the x, y and z coordinates of each antenna being used to determine the distance d' between the two antennas. Once the calibrated distance has been calculated, it can be provided together with the calibrated modeled response to the inversion process, which determines the model parameters that produce a modeled response matching the measured values for transmit and receive antennas spaced apart by calibrated distance d', as described in more detail below.

Figure 2C:
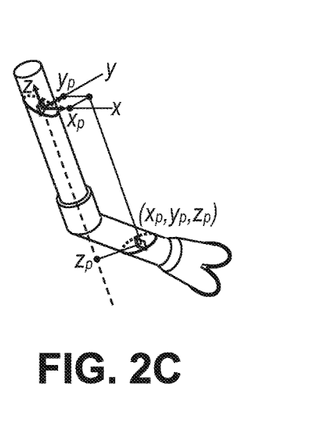
FIG. 2C shows a projection of an LWD tool module antenna's location.

In addition to using distance alone, fully described spatial locations of the transmit and receive antennas relative to each other may also be input to the inversion process to more accurately match measured responses to modeled responses when compared to inversions that do not account for such locations. These relative spatial locations take into account displacements along the x-y plane as well as along the z axis. Such displacements may be significant factors within formations with anisotropies that can affect how a signal propagates through the formation. FIG. 2C shows an example using Cartesian coordinates to locate the lower LWD tool module's antenna relative to a coordinate system centered on the upper LWD tool module's antenna. The $z_p$ coordinate of the lower antenna is projected onto the upper antenna's z axis, and the $x_p$ and $y_p$ coordinates are first projected onto the x-y plane, and then individually onto each corresponding axis. The coordinates thus fully describe the relative positions of the two antennas within the formation. It should be noted that the relative spatial locations may also be fully described using polar coordinates, i.e., in terms of the distance d' together with the relative LWD tool module inclination and azimuthal angles. Thus, calibrated distance d' may be derived from the relative spatial locations.

Figures 3, 4:
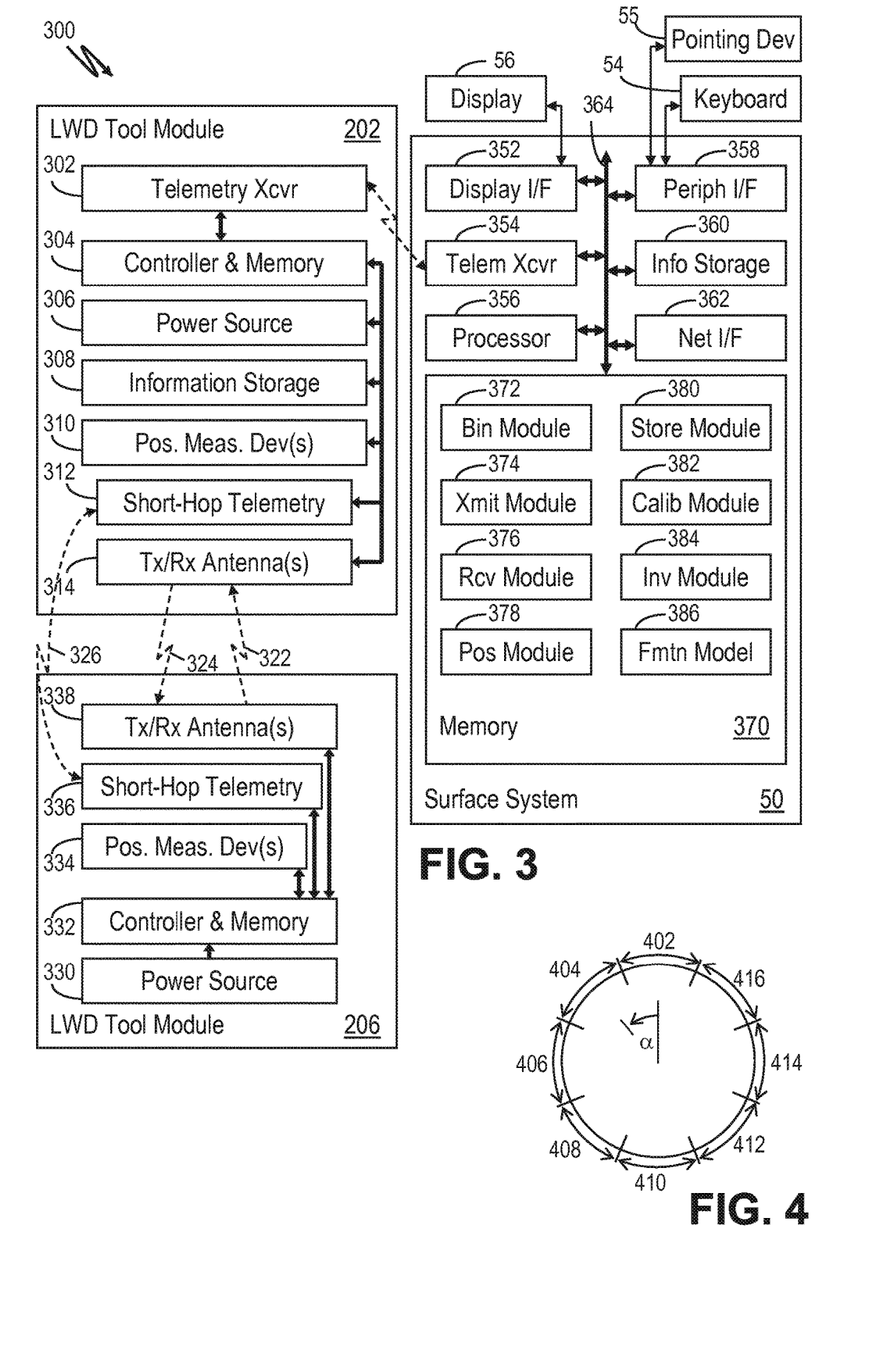
FIG. 3 shows a block diagram of two logging tool modules and a surface system.
FIG. 4 shows an illustrative azimuthal bin arrangement.

FIG. 3 is a block diagram of illustrative electronics for the above-described LWD tool modules (202 and 206) and an associated surface system 50 that together form an illustrative LWD system 300. Surface system 50 is suitable for collecting, processing and displaying logging data via display 56, and in at least some embodiments generates geosteering signals from the logging data measurements and displays them to a user. A user may further interact with the system via keyboard 54 and pointing device 55 (e.g., a mouse) to send commands to the LWD tool modules 202 and 206 to steer the drillstring in response to the received data. If desired, surface system 50 can be programmed to send such commands automatically in response to logging data measurements, thereby enabling surface system 50 to serve as an autopilot for the drilling process.

Located within surface system 50 is a display interface 352, a telemetry transceiver 354, a processor 356, a peripheral interface 358, an information storage device 360, a network interface 362 and a memory 370. Bus 364 couples each of these elements to each other and transports their communications. Telemetry transceiver 354 enables the surface system 50 to communicate with the LWD tool modules (either directly or indirectly), and network interface 362 enables communications with other systems (e.g., a central data processing facility via the Internet). In accordance with user input received via peripheral interface 358 and program instructions from memory 370 and/or information storage device 360, processor 356 processes telemetry information received via telemetry transceiver 354 to construct formation property logs in accordance with the disclosed methods and/or geosteering signals, and display them to the user.

Surface system 50 communicates with LWD tool module 202, which receives control messages from, and provides logging data to, surface system 50 via telemetry transceiver 302. Controller and memory 304 couples to telemetry transceiver 302, power source 306, information storage device 308, one or more position measurement devices 310, a short hop telemetry transceiver 312 and one or more receive and/or transmit antennas 314, coordinating the operation of the various components. In some illustrative embodiments transmit/receive antenna(s) 314 receives electromagnetic signals 322 transmitted by LWD tool module 206 that are used to measure the electrical characteristics of the surrounding formation. In other embodiments, controller and memory 304 causes transmit/receive antenna(s) 314 to transmit electromagnetic signals 324 which are received and measured by LWD tool module 206. The measurements are communicated by wireless signal 326 from LWD tool module 206 to LWD tool module 302 via short hop telemetry transceiver 312. The position of antenna(s) 314 is/are determined by position measurement device(s) 310, and the position and measurement information is forwarded to controller and memory 304 for storage within information storage device 308, with at least some of this information being communicated to surface system 50.

LWD tool module 206 includes a power source 330, controller and memory 332, position measurement device(s) 334, short hop telemetry transceiver 336 and transmit/receive antenna(s) 338, each coupled to each other and operating in a manner similar to the corresponding components of LWD tool module 202. In some embodiments, LWD tool module 206 transmits electromagnetic signals 322 for measurement by logging tool module 202, while in others LWD tool module 206 receives electromagnetic signals 324 transmitted by logging tool module 202. LWD tool modules 202 and 206 exchange information via short hope telemetry transceivers 312 and 336 that can include electromagnetic signal measurements, transmit/receive synchronization signals and configuration and control commands. This information may originate from any component within the system, including but not limited to controller and memory 304 and 332, and surface system 50. The power sources 306 and 330 used to power the downhole components of LWD tool modules 202 and 206 may include batteries, vibration energy harvesters, turbines, electrical generators or any other suitable mechanism. Transmit/receive antennas 314 and 338 may include any of a number of antennas, including but not limited to azimuthally' sensitive antennas such as tilted loop antennas. Short hop telemetry transceivers 312 and 336 may use any suitable short hop downhole communications technique. Also, additional sensors (not shown) may also be incorporated into each LWD tool module and can include temperature, pressure, lubrication, vibration, strain and density sensors to monitor drilling conditions.

Surface system processor 356 and LWD tool module controllers and memories 304 and 332 each generally operates in accordance with one or more programs stored on an information storage medium (e.g., information storage device 360). These programs cause the controller and/or processing system to carry out at least part of the methods disclosed herein. For simplicity, the description of the method that follows assumes that each of the modules performing the described functions are all resident within memory 370 and executed by processor 356 of surface system 50 (as shown in FIG. 3). Nonetheless, it is contemplated that one or more of these functions may be performed by modules resident in memory within one of LWD tool modules 202, LWD tool module 206 and/or logging tool 310, and executed by a corresponding downhole processor and/or controller. Also, although a system with one tilted transmit antenna within LWD tool module 206 and one tilted receive antenna within LWD tool module 202 operating at a single frequency is described, it is understood that any number of transmit and/or receive antennas operating and one or more frequencies may be used within each LWD tool module, and that the described methods may be implemented by systems with more than two LWD tool modules.

Figure 5:
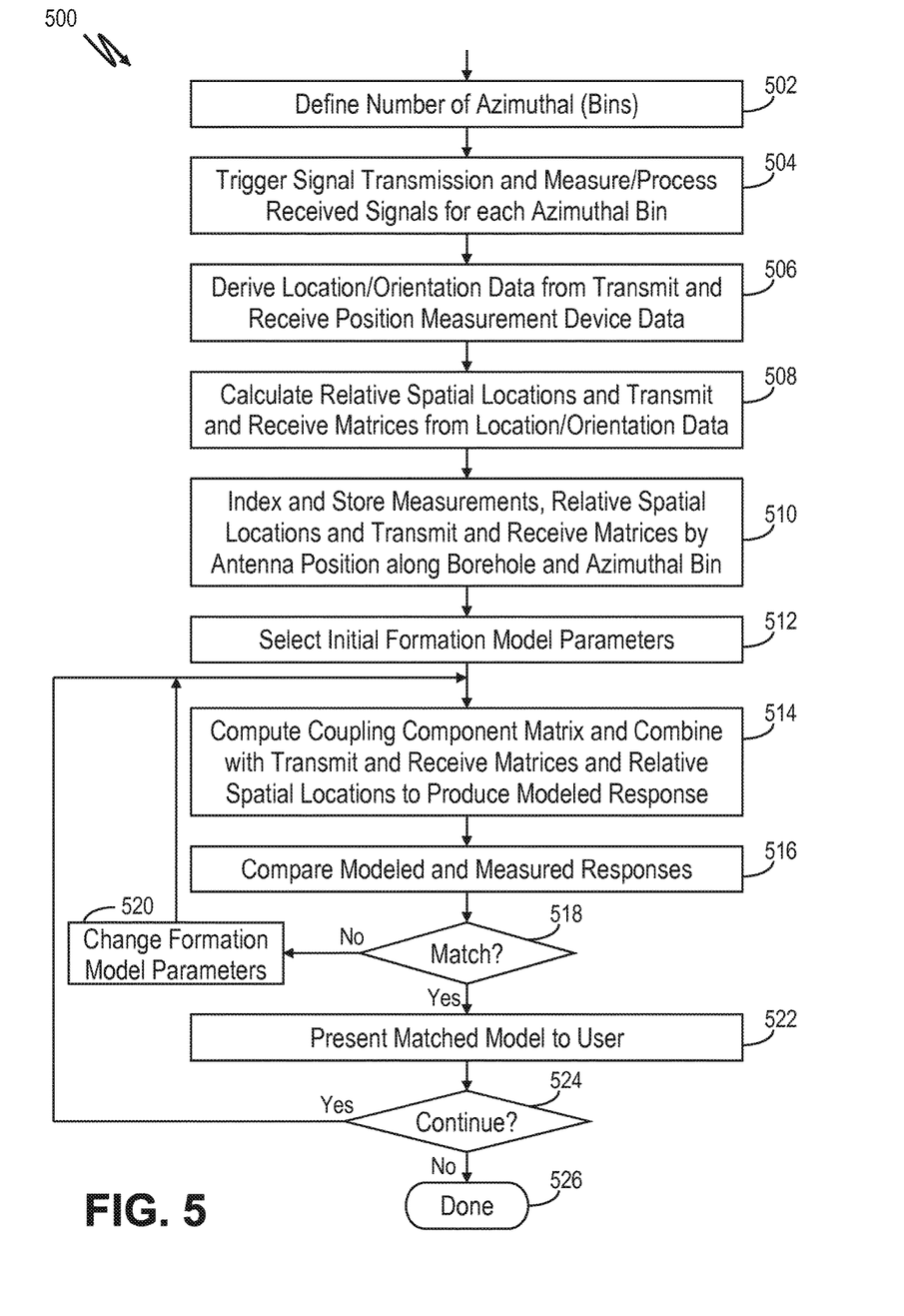
FIG. 5 shows an illustrative method for deep formation evaluation.

Before describing the illustrative method of FIG. 5, it is helpful to provide some further context. FIG. 4 shows an example of how a borehole can be divided into azimuthal bins (i.e., rotational angle ranges). In FIG. 4, the circumference has been divided into eight bins numbered 402, 404, . . . , 416. Of course, larger or smaller numbers of bins can be employed. The rotational angle is measured from the high side of the borehole (except in vertical boreholes, where the rotational angle is measured relative to the north side of the borehole). As a rotating tool gathers azimuthally sensitive measurements, the measurements can be associated with one of these bins and with a depth value. Typically LWD tools rotate much faster than they progress along the borehole, so that each bin at a given depth can be associated with a large number of measurements. Within each bin at a given depth, these measurements can be combined (e.g., averaged) to improve their reliability.

Referring now to the illustrative method and system of FIGS. 3 and 5 respectively, the number of azimuthal bins is defined (block 502, FIG. 5; binning module 372, FIG. 3) based on the number of inclined LWD tool modules, the number of frequencies of the signals propagated by the transmit antenna(s) through the formation and the number of transmit and receive antennas. In general, for a greater number of inclined LWD tool modules (i.e., a greater borehole path complexity), a greater number of bins are needed to perform an inversion to determine the formation model. For greater numbers of frequencies and antennas, smaller numbers of bins may be used. Thus, for example, a system operating at a single frequency that has a single bent sub with one transmitter and one receiver can require as few as four azimuthal measurements, while a single frequency system with one transmitter and two receivers or two transmitters and one receiver can require as few as two azimuthal measurements.

Once the number of bins is defined, electromagnetic signal transmission is triggered (e.g., signals 322 front a transmit antenna 338 within LWD tool module 206, triggered by transmit module 374; block 504), causing the signals to propagate through the surrounding formation to a receive antenna (e.g., receive antenna 314 within LWD tool module 202), where the signal is sampled and measured for each azimuthal bin, and further processed to produce a measurement (block 504; receive module 376). In at least some illustrative embodiments, the measurement represents a deep formation measurement (e.g., resistivity, voltage, current, etc.). Data is concurrently collected from position measurement devices 310 and 334 for each measurement, which is used in the derivation of antenna location and orientation data (block 506; position module 378).

Once the location and orientation data has been derived, the data can be used to calculate the transmit and receive vectors $T_{vector}^{T}(t_0)$ and $R_{vector}(t_0)$ of equations (1) and (2) and the corresponding relative spatial locations of the transmit and receive antennas (block 508; calibration module 382). As previously noted, measurements corresponding to a same index (i.e., same borehole position and azimuthal bin) may be aggregated, with the aggregated data being used in the above-described calculation. The measurements, relative spatial locations and transmit and receive matrices are then indexed by antenna position along the borehole and by azimuthal bin and stored on a storage device (block 510; storage module 380), such as information storage device 360.

The stored indexed data may subsequently be used as input to an inversion process that begins with the selection of initial formation model parameters (block 512; inversion module 384). Such parameters may include, but are not limited to, adjusted estimated formation resistivity, anisotropy, dip and bed boundaries. The coupling component matrix $V_{matrix}(t_0)$ of equations (1) and (2) is computed based on the selected parameters for formation model 386 and combined with the transmit and receive vectors and the relative spatial locations to produce a calibrated modeled response (block 514; inversion module 382). The calibrated modeled response is compared with the measured response (block 516; inversion module 382) to determine if the responses match. Such a "match" is not necessarily an exact match, but may instead be based on an acceptance criteria such, for example, as a least squares criteria calculated over a set of values around the full circumference of the tool and for a specific depth range. Other acceptance criteria suitable for use with the disclosed methods and systems will become apparent to those of ordinary skill in the art, and all such criteria are within the scope of the present disclosure.

If the differences between the calibrated model and measured responses does not fall within the acceptance criteria (block 518, inversion module 382) different formation model parameters are selected (block 520; inversion module 382), and blocks 514 through 518 are repeated by inversion module 382. Once a match is achieved, the formation model with the parameters that produced the match is presented to a user (block 522; inversion module 382), for example, as a display indicating the formation composition. If drilling continues (block 524; inversion module 382), the inversion process continues using the identified module. If a mismatch between the modeled and measured responses is identified, the model parameters are again changed until a match is found (blocks 514 through 518). The inversion process defined by blocks 514 through 524 continues until drilling completes (block 524), ending the method (block 526).

The above-described inversion process uses the relative spatial locations of the receive and transmit antennas as an input. This determination of these relative spatial locations depends upon an accurate determination of the positions of the transmit and receive antennas, which may include the antennas' locations (e.g., latitude, longitude and depth, relative distance to a reference point, etc.) and/or orientations (e.g., compass heading, angle relative to a vertical or horizontal plane, direction towards a reference point, etc.). In the above-described embodiments these positions are determined at least in part by the position measurement devices 222a and 222b of FIG. 2A. Each position measurement device may include one or more devices, including but not limited to magnetometers, inclinometers, accelerometers and gyroscopes. In at least some illustrative embodiments, these devices operate together to track their movement relative to a known reference point at the top of the borehole as the position measurement device progresses downhole.

Figure 6:
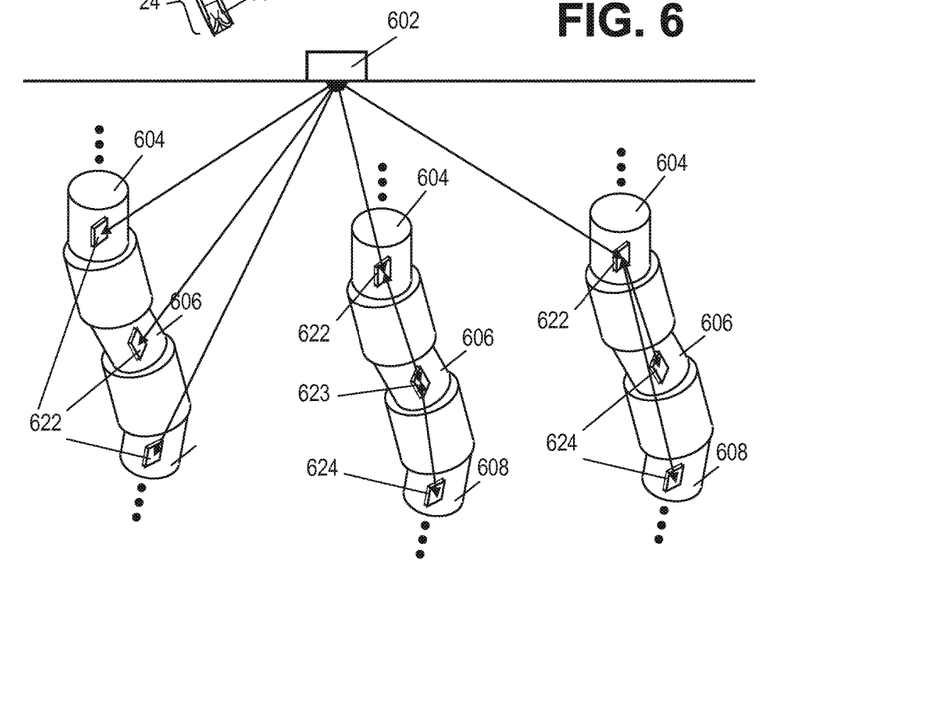
FIG. 6 shows three illustrative drillstrings, each with three logging tool modules.

In some illustrative embodiments, such as those shown in FIG. 6, one or more position measurement devices 622 transmit one or more very low frequency signals (e.g., a 1 Hz electromagnetic, seismic or acoustic signal) to, or receive a signal from, a surface receiver/transmitter 602. In the left embodiment of FIG. 6, each position measurement device 622 within LWD tool modules 604, 606 and 608 communicates with surface station 602 to determine the direction towards each position measurement device or surface station (e.g., using a phased array) and the distance between each position measurement device and the surface station (e.g., by calculating signal propagation delays).

For clarity, previous embodiments have been described as having position measurement devices co-located with each antenna that each determines its own position relative to an external coordinate system (e.g., a geographical position, a position relative to a surface location, etc.). In practice, it is the spatial relationships of the antennas that are desired, and any tool configuration that provides such relationships may be used. For example, in at least some illustrative embodiments a single position measurement device may be used that determines the spatial location of each antenna relative to its own position by receiving low frequency signals from transmitters (such as those described above) that are each co-located with an antenna. Such a position measurement device can itself be co-located with one of the antennas, or not co-located with any of the antennas. The information needed to determine the position of each transmitter and thus the corresponding antenna(s) (e.g., distance and angle to the position measurement device) may be derived based on the characteristics of the signals received and/or processed by the position measurement device (e.g., propagation delay, phase, amplitude, direction, etc.).

The center embodiment of FIG. 6 shows an example of an LWD tool that determines relative positions of at least some of the antennas within the tool. In this example, low frequency transmitter 624 within LWD module 608 and low frequency transceiver 623 within LWD module 606 are each co-located with an antenna (not shown). Transmitter 624 provides a signal to transceiver 623, which determines a relative location and orientation of transmitter 624 and its corresponding antenna. This information may be forwarded to position measurement device 622 for further processing (e.g., using a short hop communication link as previously described). Transceiver 623 also transmits a signal received by position measurement device 622, which may then determine the position of transceiver 623 relative to position measurement device 622 based on the received signal. In the right embodiment shown in FIG. 6, transmitters 624 within each of LWD tool modules 606 and 608 transmit a signal received by position measurement device 622 of LWD tool module 604, which determines the relative direction and distance to each transmitter. In embodiments that calculate relative direction and distance, position measurement device 622 within LWD tool module 604 determines an absolute reference position using any of the techniques described to provide a basis for determining the positions of the antennas within the LWD tool modules further downhole. Many other combinations of absolute and relative position calculations based on measurements by any of a number of position measurement device configurations will become apparent to those of ordinary skill in the art, and all such calculations and configurations are within the scope of the present disclosure.

As can be seen from FIG. 6, the use of position measurement devices for each of multiple LWD tool modules enables the position of each antenna within each module to be tracked even with complex module positioning, enabling a more accurate determination of the distance between transmit and receive antennas as compared with systems and methods that presume a fixed distance. This can be useful with boreholes with one or more "doglegs", where the drilling direction changes several times in several different directions. The disclosed systems and methods account for these changes, enabling accurate calculations of the distances between transmit and receive antennas along a drillstring while traversing complex borehole paths, and thus enabling more accurate deep formation evaluations of the surrounding formation when compared to system that presume fixed distances between the antennas.

Numerous other modifications, equivalents, and alternatives, will become apparent to those skilled in the art once the above disclosure is fully appreciated. For example, although FIG. 2A shows an "at bit" LWD tool module separated from the logging tool by a bent sub, any number of other separate LWD tool modules positioned at locations along the drillstring other than adjacent to the drilling bit may alternatively or additionally be present. Also, although the illustrative embodiments are shown and described within the context of induction and EM resistivity logging tools, other embodiments may alternatively or additionally include other logging and measurement tools (e.g., galvanic resistivity logging tools). Further, although the rotation portion of the disclosed calibration is perforated by rotating the modeled response for comparison to the measured response, the calibration may also be performed by rotating the measured response instead prior to the comparison. It is intended that the following claims be interpreted to embrace all such modifications, equivalents, and alternatives where applicable.

What is claimed is:

1. A plurality of logging while drilling (LWD) tool modules positioned along a drillstring that comprise:
 a first module of the plurality of LWD tool modules that comprises a transmit antenna;
 a second module of the plurality of LWD tool modules that comprises a receive antenna; and
 at least one position measurement device that at least partially determines spatial locations of the transmit and receive antennas relative to each other;
 wherein a calibrated distance between the receive antenna and the transmit antenna is further determined by adjusting an original distance between the receive antenna and the transmit antenna based at least in part upon the relative spatial locations;
 wherein a formation model is matched to a surrounding formation based at least in part on said relative spatial locations.

2. The LWD tool modules of claim 1, wherein the formation model comprises a formation resistivity model.

3. The LWD tool modules of claim 1, wherein the plurality of LWD tool modules are part of an LWD tool that performs deep formation resistivity measurements.

4. A plurality of logging while drilling (LWD) tool modules positioned along a drillstring that comprise:
 a first module of the plurality of LWD tool modules that comprises a transmit antenna;
 a second module of the plurality of LWD tool modules that comprises a receive antenna; and
 at least one position measurement device that at least partially determines spatial locations of the transmit and receive antennas relative to each other;
 wherein a formation model is matched to a surrounding formation based at least in part on said relative spatial locations;
 wherein at least one of the plurality of LWD tool modules accepts a receive antenna signal representative of a measured response to a transmit antenna signal propagated through the surrounding formation;
 wherein the formation model is further matched to the surrounding formation by comparing the measured response to a modeled response that is adjusted based on receive and transmit antenna azimuthal and tilt angles and on LWD tool module inclination angles;
 wherein one or more parameters of the matched formation model are identified by an inversion that uses as inputs at least said adjusted response and said relative spatial locations.

5. A plurality of logging while drilling (LWD) tool modules positioned along a drillstring that comprise:
 a first module of the plurality of LWD tool modules that comprises a transmit antenna;
 a second module of the plurality of LWD tool modules that comprises a receive antenna; and
 at least one position measurement device that at least partially determines spatial locations of the transmit and receive antennas relative to each other;
 wherein a first of the relative spatial locations is determined relative to a surface reference location;
 wherein a formation model is matched to a surrounding formation based at least in part on said relative spatial locations.

6. A logging while drilling (LWD) system that comprises:
 a surface computing system; and
 a plurality of LWD tool modules, positioned along a drillstring and in communication with the computing system, that comprise:
 a first LWD tool module that comprises a transmit antenna;
 a second LWD tool module that comprises a receive antenna; and
 at least one position measurement device that at least partially determines spatial locations of the transmit and receive antennas relative to each other;
 wherein a calibrated distance between the receive antenna and the transmit antenna is further determined by adjusting an original distance between the receive antenna and the transmit antenna based at least in part upon the relative spatial locations;
 wherein a formation model is matched to a surrounding formation based at least in part on said relative spatial locations.

7. The LWD system of claim 6, wherein the formation model comprises a formation resistivity model.

8. The LWD system of claim 6, wherein the plurality of LWD tool modules are part of an LWD tool that performs deep formation resistivity measurements.

9. The LWD system of claim 6, wherein the relative spatial locations are further determined at least in part by a low frequency signal communicated between at least one of the plurality of LWD tool modules and a surface station.

10. The LWD system of claim 9, wherein the relative spatial locations are further determined at least in part by measuring the propagation delay of the low frequency signal or the direction of origin of the low frequency signal.

11. The LWD system of claim 9, wherein the low frequency signal comprises a signal selected from the group consisting of an acoustic signal, a seismic signal and an electromagnetic signal.

12. A logging while drilling (LWD) system that comprises:
 a surface computing system; and
 a plurality of LWD tool modules, positioned along a drillstring and in communication with the computing system, that comprise:
 a first LWD tool module that comprises a transmit antenna;
 a second LWD tool module that comprises a receive antenna; and
 at least one position measurement device that at least partially determines spatial locations of the transmit and receive antennas relative to each other;
 wherein a first of the relative spatial locations is determined relative to a surface reference location;
 wherein a formation model is matched to a surrounding formation based at least in part on said relative spatial locations.

13. A logging while drilling (LWD) system that comprises:
 a surface computing system; and
 a plurality of LWD tool modules, positioned along a drillstring and in communication with the computing system, that comprise:

a first LWD tool module that comprises a transmit antenna;

a second LWD tool module that comprises a receive antenna; and at least one position measurement device that at least partially determines spatial locations of the transmit and receive antennas relative to each other;

wherein a formation model is matched to a surrounding formation based at least in part on said relative spatial locations;

wherein at least one of the plurality of LWD tool modules accepts a receive antenna signal representative of a measured response to a transmit antenna signal propagated through the surrounding formation;

wherein the formation model is further matched to the surrounding formation by comparing the measured response to a modeled response that is adjusted based on receive and transmit antenna azimuthal and tilt angles and on LWD tool module inclination angles;

wherein one or more parameters of the matched formation models are identified by an inversion that uses as inputs at least said adjusted response and said relative spatial locations.

14. The LWD system of claim 13, wherein the inversion is performed by the surface computer system.

15. A method for determining one or more formation models, comprising:

activating a transmitter within a first logging while drilling (LWD) tool module of a plurality of LWD tool modules positioned along a drillstring and causing a signal to propagate from a transmit antenna within the first LWD tool module through a surrounding formation;

receiving the propagated signal at a receive antenna within a second LWD tool module of the plurality of LWD tool modules;

determining relative spatial locations of the transmit and receive antennas based at least in part on data provided by one or more position measurement devices co-located with at least one of the transmit and receive antennas;

matching a formation model to the surrounding formation based at least in part on said relative spatial locations; and presenting the matched formation model to a user.

16. The method of claim 15, wherein the formation model comprises a formation resistivity model.

17. The method of claim 15, further comprising obtaining deep formation resistivity measurements of the surrounding formation at least in part by performing the activating of the transmitter and the receiving of the propagated signal.

18. The method of claim 15, further comprising determining a calibrated distance between the receive antenna and the transmit antenna by adjusting an original distance between the receive antenna and the transmit antenna based at least in part upon the relative spatial locations.

19. The method of claim 15, further comprising:

adjusting a modeled response based on receive and transmit antenna azimuthal and tilt angles and on LWD tool module inclination angles corresponding to each antenna; and matching the formation model to the surrounding formation by further comparing the adjusted modeled response to a response signal representative of the received propagated signal.

* * * * *